3,097,241
N-CYCLOHEXANE-SULPHONYL-N'-(β-PHENYLETHYL)-UREA

Gerhard Korger, Hans Wagner, and Walter Aumuller, Frankfurt am Main, and Heinrich Ruschig, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed Aug. 6, 1957, Ser. No. 676,500
Claims priority, application Germany Aug. 10, 1956
1 Claim. (Cl. 260—553)

The present invention relates to the preparation of novel sulfonylureas. More particularly, the present invention is directed to novel sulfonylureas having the general formula:

$$R-SO_2-NH-CO-NH-R_1$$

in which R represents a phenyl radical that may be substituted by one or two radicals of the group of alkyl or alkoxy radicals whose alkyl group preferably contains up to 8 carbon atoms, or of the group of halogen atoms, or it represents an aliphatic or cycloaliphatic hydrocarbon radical containing 3 to 8 carbon atoms or a naphthalene-2, a 5:6:7:8-tetrahydro-naphthalene-2 or a 4-phenoxyphenyl radical and $R_1$ means the radical $-(CH_2)_n-C_6H_5$, $n$ standing for the numbers 2–4.

Their compounds and their salts are also valuable medicaments and are particularly characterized by a considerable lowering of the blood sugar level effective for a long period and by a very reduced toxicity.

In detail, R may stand for the following radicals: phenyl and substituted phenyl radicals such as methyl-phenyl, in particular para-methyl-phenyl, ethyl-phenyl, propyl-phenyl, butyl-phenyl, pentyl-phenyl and hexyl-phenyl. The substituents may be branched or of straight chain. Besides of in para position the substituent can also be linked in another position, particularly in meta position of the phenyl radical. Furthermore, R may stand for a halogen phenyl radical, such as chlorophenyl and bromophenyl. Disubstituted phenyl radicals, for instance dialkyl, dialkoxy and alkylalkoxy phenyl radicals may also be mentioned. Phenyl radicals simultaneously containing an alkyl as well as an alkoxy group and a halogen atom, for instance methyl-chloro-phenyl, can likewise by used. The substitutents may be in any desired position at the benzene nucleus. R may also stand for a diphenyl ether or a naphthalene or tetrahydronaphthalene radical. Finally, R may represent an alkyl radical, for instance a propyl, butyl, pentyl, hexyl radical; a cycloalkyl radical, for instance the cyclohexyl radical; and a cycloalkyl-alkyl radical, for instance the hexahydro-benzyl radical. As far as an aliphatic radical is concerned, it may be of straight or branched chain.

The present invention also relates to the manufacture of such compounds as may be produced according to methods generally applied for the preparation of sulphonylureas. The following methods may be applied:

Sulphonyl isocyanates of the formula $$R-SO_2-NCO$$

can be reacted with compounds of the formula $R_1-NH_2$. However, it is also possible to obtain the desired ureas in a reverse reaction by reacting compounds of the formula $R_1-NCO$ with sulphonic acid amides of the formula $$R-SO_2-NH_2$$

For the reaction with the isocyanates the sulphonic acid amides are preferably used in the form of their salts, particularly in the form of the sodium or potassium salts. Furthermore, it is possible to prepare the new compounds by reacting sulphonyl-urethanes of the formula $$R-SO_2-NH-COO-R_2$$

in which $R_2$ stands for any desired, preferably low molecular hydrocarbon radical, such as a methyl, ethyl, propyl, butyl or aryl radical, with compounds of the formula $R_1-NH_2$ or, conversely, sulphamides of the formula $$R-SO_2-NH_2$$

with urethanes of the formula $R_1-NH-COO-R_2$ in which $R_2$ stands for any desired, preferably low molecular, hydrocarbon radical, for instance a methyl, ethyl, propyl, butyl or aryl radical. In many cases simple heating of the reactants to temperatures above 100° C. leads to particularly good yields. In addition, sulphonyl-carbamic acid halides of the formula $$R-SO_2-NH-CO-Hal$$

may, for example, be reacted with primary amines of the formula $R_1-NH_2$ or, conversely, sulphamides of the formula $$R-SO_2-NH_2$$

with carbamic acid halides of the formula $$R_1-NH-CO-Hal$$

When reacting sulphamides with ureas containing one aliphatic or cycloaliphatic substituent it can be of special advantage to apply the sulphamides in the form of their alkali metal salts and the urea derivatives in the form of correspondingly acylated compounds, for instance acetyl, propionyl or benzoyl-compounds, or of correspondingly nitrated compounds and to heat the components in the absence of solvents to elevated temperatures, advantageously between 130 and 160° C.; conversely, a hydrogen atom in sulphonyl-ureas of the formula $$R-SO_2-NH-CO-NH_2$$

can be replaced by the radical $R_1$, for example with the aid of primary amines of the formula $R_1-NH_2$. The reaction of sulphonic acid halides of the formula $$R-SO_2-Hal$$

with iso-urea ethers can, for example, be carried out in an aqueous medium in the presence of potassium carbonate when using solid sulphonic acid halides. According to an advantageous method of preparation the iso-urea ethers are reacted in the form of salts, in aqueous acetonic solution and, while cooling, with sulphonic acid halides in the presence of alkali metal hydroxide solutions. The sulphonyl-iso-urea ethers separating from the solution are filtered with suction and, if necessary, recrystallized from dilute alcohols. They are heated, for example, with concentrated acids, preferably hydrochloric acid, to temperatures ranging between about 60 and 100° C., gas being evolved at the same time. In a further process according to the invention sulphur is eliminated from corresponding sulphonyl-thio-ureas by means of heavy metal oxides in the presence of solvents; in this connection it can be of advantage to use, instead of the heavy metal oxides, corresponding metal salts, for example, lead, copper or silver salts. A further customary method of the desulphurization is the oxidation of the sulphonyl-thio-ureas with, for example, sodium peroxide or nitrous acid. Finally, it is also possible according to the process of the present invention to hydrolyze corresponding sulphonyl-guanidines which may be obtained in known manner, for example, by reaction of sulphonyl-cyanamides with a primary amine (cf. French specification 913,967 and British specification 595,472) or by reaction of sulphonic acid chlorides with alkyl guanidines in the presence of alkali, this reaction suitably being effected by slowly heating the substances in aqueous solution with alkali hydroxides.

The reaction conditions under which the processes for the manufacture of the products are carried out may vary within wide limits and can be adapted to each particular case. For example, the reactions may be carried out in many cases by simply heating the components but also with the use of solvents such as acetone, toluene, xylene and chlorobenzene at room temperature or at a higher temperature. In order to obtain the products of the present invention in as pure a state as possible it is advantageous to separate the product thoroughly from the benzene sulphamides used as starting material or formed in the course of the reaction. Advantageously, this reaction is carried out by taking up the products in dilute ammonia, wherein these ureas are relatively easily soluble, and reprecipitating them from the solutions by acidification with organic or inorganic acids.

As alkyl radicals, of which one or two may be present as substituents in the phenyl radical, perhaps by means of an oxygen linkage, there enter preferably into consideration radicals of low molecular weight. It is particularly advantageous to use radicals containing 1 to 6 carbon atoms. Radicals containing up to 8 carbon atoms may also be used. The efficiency of the products obtained according to the invention is, however, considerably reduced when using radicals of more than 8 carbon atoms. Instead of the benzene-sulphonyl compounds that may be substituted by alkyl or alkoxy radicals also aromatic compounds can be useed which in the phenyl radical are substituted once or doubly by a halogen atom, preferably chlorine or bromine, or by a halogen atom in addition to an alkyl or alkoxy radical. The different methods for the manufacture of the desired sulphonyl ureas are the same as described above, also when halogen substituted benzene-sulphonyl compounds are used.

The above description mainly deals with benzene-sulphonyl compounds used as starting substances. According to the invention it is, however, also possible to use as starting substances aliphatic and cycloaliphatic sulphonyl compounds with 3 to 8 carbon atoms. Also in this case the desired sulphonyl ureas can be obtained according to such methods as are generally applied for the manufacture of sulphonyl ureas, for instance according to the methods described above. These methods may also be applied for the manufacture of sulphonyl ureas of the general formula indicated above in which R represents a diphenyl ether, a naphthalene or a tetrahydronaphthalene radical.

Many of the starting materials suitable for use in the present process have been described in literature. There may be mentioned, for example: benzene-sulphamide, 4-methyl-benzene - sulphamide, 4-ethyl-benzene-sulphamide, 4-n-propyl-benzene-sulphamide, 4-isopropyl-benzene-sulphamide, 4-n-butyl-benzene-sulphamide, 4-tert.-butyl-benzene - sulphamide, 4-n-hexyl - benzene - sulphamide, 4 - methoxy - benzene - sulphamide, 4 - ethoxy - benzene-sulphamide, 4-n-butoxy-benzene-sulphamide. There can also be used the corresponding sulphonyl isocyanates or sulphonyl carbamates, of which there are mentioned: benzene-sulphonyl isocyanate, 4-methyl-benzene-sulphonyl isocyanate, 4-ethyl-benzene-sulphonyl isocyanate, 4-ethoxy-benzene-sulphonyl isocyanate, 4 - methyl - benzene-sulphonyl-methyl-carbamate, 4 - isopropyl - benzene-sulphonyl-methyl-carbamate, 4-methoxy-benzene-sulphonyl-methyl-carbamate, as well as the corresponding ethyl-carbamates. Instead of compounds substituted in the benzene nucleus in 4-position, there can also be used the corresponding compounds substituted in 2-position, even better in 3-position.

Furthermore, there can be used as starting substances: halogen - benzene - sulphonyl - isocyanates, preferably the chlorine and bromine compounds, the halogen atom being allowed in any desired position in the benzene nucleus; correspondingly substituted benzene - sulphonic acid amides; correspondingly substituted benzene-sulphonyl urethanes containing in the urethane component an alkyl radical of low molecular weight, for instance a methyl, ethyl, propyl and butyl radical, or an aryl radical; correspondingly substituted benzene-sulphonyl ureas; correspondingly substituted benzene-sulphonic acid halides.

There may also serve as starting substances: dihalogenbenzene-sulphonyl isocyanates, the halogen atoms being allowed in any desired position in the benzene nucleus; correspondingly disubstituted benzene-sulphonic acid amides, correspondingly disubstituted benzene-sulphonylurethanes; correspondingly disubstituted benzene-sulphonyl ureas; correspondingly disubstituted benzene-sulphonyl carbamic acid halides; correspondingly disubstituted benzene-sulphonic acid halides.

Dimethyl-benzene-sulphonyl compounds in the form of their chlorides, amides, isocyanates, carbamic acid halides, carbamates and ureas or also the corresponding dimethoxy-benzene-sulphonyl compounds or alkyl-halogen-benzene, alkoxy-halogen-benzene and alkoxy-alkyl-benzene-sulphonyl derivatives may likewise be used as starting substances. Furthermore, there come into consideration: alkyl, cycloalkyl, cycloalkylalkyl, naphthalene-(2), 5:6: 7:8 - tetrahydronaphthalene - (2) and 4-phenoxy-phenyl sulphonic acid amides or sulphonyl-isocyanates. As alkyl, cycloalkyl and cycloalkylalkyl-sulphonyl compounds there are mentioned such sulphonamides as contain, for example, the following radicals: propyl, butyl(1), butyl(2), 2-methyl-propyl(1), pentyl(2), pentyl(3), 3-methyl-butyl(1), 2-methyl-butyl(2), hexyl(1), cyclohexyl, cyclohexyl-methyl. Naturally, there may also be used the corresponding sulphonyl urethanes containing in the urethane component a low molecular alkyl radical, for instance a methyl, ethyl, propyl, butyl radical or an aryl radical as well as the isocyanates, carbamic acid halides, ureas, sulphonic acid halides, thioureas and guanidines derived from these compounds. Instead of the sulphonyl isocyanates also other compounds than those mentioned above can be used which in the course of the reaction behave like isocyanates, for example addition compounds of benzene-sulphonyl isocyanates with cyclic acid amides such as caprolactam, butyrolactam and the like, furthermore with weakly basic amines such as carbazole and the like.

For the reaction with the above-mentioned compounds there can be used according to the invention β-phenyl-ethylamine, γ-phenyl-propylamines and γ-phenyl-butyl-amines.

Instead of the above-mentioned amines there can also be used according to the process of the invention for the reaction with the sulphonyl derivatives mentioned above the corresponding isocyanates, urethanes, carbamic acid halides, ureas, acyl-ureas and isourea ethers preparable from these amines. Instead of isocyanates there are likewise suitable others than the compounds mentioned which in the course of the reaction behave like isocyanates, for example acid azides, for instance hydrocinnamic acid azide.

The compounds obtainable according to the process of the present invention are characterized by a great stability. In contradistinction to the amino-benzene-sulphamides which are of importance in chemotherapy, the compounds obtained according to the present invention show a considerable stability against oxidizing influences.

The compounds obtained according to the invention constitute valuable medicaments which are characterized by a high hypoglycemic effect. They are distinguished from the known amino-benzene-sulphamides primarily by the fact that due to the absence of an amino group in para-position they are derived of any chemotherapeutic effect comparable to that of the sulphanil amides. For instance, no action on the bacterial flora of the alimentary tract takes place, and, furthermore, a development of resistance to pathogenic germs, to be feared in permanent use, has not been observed. The new compounds can be prepared in a simpler manner than the known aminobenzene-sulphonyl ureas.

Pharmacological tests on the rabbit have shown that, for example, when 400 milligrams/kilogram of N-cyclohexane-sulphonyl-N'-(β-phenyl-ethyl)-urea are administered per os in the form of the sodium salt the blood sugar level is reduced by 45% on an average. After feeding for instance N-(3.4-dimethyl-benzene-sulphonyl)-N'-(β-phenyl-ethyl)-urea a reduction of the blood sugar level by about 40% on an average is observed. The observations made on rabbits could be confirmed by tests carried out on other control animals. If, for instance, fasting dogs were orally administered a dosis of 100 milligrams per kilogram of N-(4-methyl-benzene-sulphonyl)-N'-(β-phenyl-ethyl)-urea obtained according to the process of the present invention, the following reduction of the blood sugar level were stated:

33% after 2 hours
37% after 3 hours
37% after 6 hours
15–20% after 24 hours
0% after 48 or 72 hours Furthermore, the N-(naphthalene-2-sulphonyl)-N'-(β-phenyl-ethyl)-urea provokes a reduction of the blood sugar level of 45% in the rabbit, the N-(4-isopropyl-benzene-sulphonyl)-N'-(β-phenyl-ethyl)-urea equally causes a reduction of the blood sugar level of 45%, the N-(4-methyl - benzene - sulphonyl) - N' - (3' - phenyl-propyl)-urea causes a reduction of the blood sugar level amounting to 40% and the N-(3-chloro-4-methyl-benzene-sulphonyl)-N'-(β-phenyl-ethyl)-urea causes a reduction of the blod sugar level amounting to 35%.

The above values were obtained by comparison with the blood sugar level of control animals fed in the same way but not so treated. The blood sugar values can be ascertained by hourly analyses according to the method of Hagedorn-Jensen.

The products obtained according to the process of the present invention are of very low toxicity. For instance the LD$_{50}$ in mice for the N-(4-methyl-benzene-sulphonyl)-N'-(β-phenyl-ethyl)-urea obtained according to the process of the present invention amounts to 5.5 to 6 grams per kilogram.

The compounds obtained according to the process of the present invention are preferably destined to serve as components for preparations showing a blood sugar reducing effect and suitable to be orally administered in the treatment of diabetes mellitus.

The compounds may be administered as such or in the form of their salts or in the presence of substances which cause salt formation. For the salt formation there can be used: ammonia, alkaline metal agents, such as alkaline metal hydroxides or alkaline earth metal hydroxides, alkali metal carbonates or alkali metal bicarbonates, furthermore physiologically tolerable organic bases.

British Patent 604,259 discloses sulphonyl ureas of the general formula

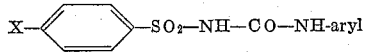

in which X represents an amino group or a radical which can be transferred into an amino group and aryl stands for a substituted or unsubstituted benzyl radical. The examination of these compounds, particularly of the N-(4-aminobenzene-sulphonyl)-N'-benzyl-urea has shown that they do not exhibit an analogous hypoglycemic efficiency as the compounds of the present invention.

It could, therefore, not be expected that the products of the present invention would exhibit such a good antidiabetic action. Primarily it could not be expected that the compounds concerned, in spite of the presence of an aryl-alkyl radical, would be of such a low toxicity. The following examples illustrate the invention:

EXAMPLE 1

*N-Cyclohexane-Sulphonyl-N'-(β-Phenyl-Ethyl)-Urea*

23.5 grams of cyclohexane-sulphonyl-ethyl-carbamate (prepared from cyclohexane-sulphamide and chloroformic acid ethyl ester in acetone, in the presence of ground potassium carbonate) and 12.2 grams of β-phenyl-ethylamine are united while cooled, and subsequently heated in an open flask for 1 hour to 130° C. After cooling, the melt is dissolved in dilute ammonia, the solution is clarified with charcoal and reacidified with dilute hydrochloric acid. The N-cyclohexane-sulphonyl-N'-(β-phenyl-ethyl)-urea obtained in good yield is filtered off with suction, thoroughly washed with water and after having been dried, recrystallized from ethyl acetate. It melts at 128–130° C.

EXAMPLE 2

*N-Cyclohexane-Sulphonyl-N'-(3-Phenyl-Propyl-(1))-Urea*

To a solution of 25 grams of cyclohexane-sulphonylisocyanate (boiling at 88–94° C. at a pressure of 0.5 mm. Hg absolute; prepared from cyclohexane-sulphamide and phosgene) in 250 cc. of absolute benzene are slowly added dropwise while stirring 18 grams of 3-phenyl-propylamine-(1) and the reaction mixture is then boiled for 1 hour under reflux. The solid residue obtained after elimination by distillation of the benzene is dissolved in dilute ammonia, the solution is clarified with charcoal and acidified by means of hydrochloric acid. The N-cyclohexane-sulphonyl-N'-(3-phenyl-propyl-(1))-urea obtained in a good yield melts at 125° C. after having been recrystallized from acetonitrile.

EXAMPLE 3

*N-(4-Methoxy-3-Methyl-Benzene-Sulphonyl)-N'-(β-Phenyl-Ethyl)-Urea*

34 grams of 4-methoxy-3-methyl-benzene-sulphonylcarbamic acid ethyl ester (melting point 112° C.; prepared from 4-methoxy-3-methyl-benzene-sulphamide and chloroformic acid ethyl ester in acetone and in the presence of ground potassium carbonate) and 15.5 grams of β-phenyl-ethyl-amine are united while cooled, the reaction mixture is slowly heated in an open flask to 130° C. and kept at this temperature for a further hour. The crystalline cake obtained is dissolved in dilute ammonia, the solution is clarified with charcoal and cautiously acidified with hydrochloric acid. The N-(4-methoxy-3-methyl-benzene-sulphonyl-n'-(β-phenyl - ethyl) - urea obtained in a good yield is filtered off with suction, thoroughly washed with water and dried. Melting point 151° C. (after recrystallization from acetonitrile).

EXAMPLE 4

*N-(4-Methyl-Benzene-Sulphonyl)-N'-(β-Phenyl-Ethyl)-Urea*

40 grams of N-4-methyl-benzene-sulphonyl-isocyanate are dissolved in 120 cc. of absolute benzene, nitrogen is conducted through while stirring, and the solution of 24 grams of β-phenyl-ethyl-amine in 30 cc. of absolute benzene is dropwise added within 45 minutes. The whole is stirred for a further 2 to 3 hours at 70° C. and the benzene is evaporated off under reduced pressure. The remaining crystalline residue is taken up in 250 cc. of dilute ammonia (1:30), the solution obtained is diluted by means of about 500 cc. of water and filtered several times through a layer of animal charcoal. By acidifying the clear filtrate by means of 2 N-hydrochloric acid a half-solid precipitate is at first obtained which perfectly crystallizes after having been allowed to stand for some time. It is filtered off with suction, thoroughly washed with water and recrystallized from about 700 cc. of ethanol of 50% strength. In this manner the N-(4-methyl-benzene-sulphonyl)N'-(β-phenyl-ethyl)-urea is obtained in a good yield, melting at 145–147° C.

EXAMPLE 5

*N-(4-Methyl-Benzene-Sulphonyl)-N'-(β-Phenyl-Ethyl)-Urea*

23 grams of N-4-methyl-benzene-sulphonyl-methyl-carbamate melting at 112–113° C. (prepared by reaction of p-toluene-sulphamide and chloroformic methyl ester in the presence of anhydrous potassium carbonate and acetone) are heated for 7 hours to 100° C. with 12.1 grams of β-phenyl-ethyl-amine and 40 cc. of 1.2-dichlorobenzene. After cooling the reaction mixture is diluted with ether and shaken several times with dilute sodium hydroxide solution. The combined alkaline extracts are acidified with dilute hydrochloric acid, the half-solid precipitate that has been formed is separated from the mother-liquor, taken up in dilute ammonia (proportion 1:50) and the solution thus obtained is filtered with charcoal. After renewed acidification by means of 2 N-hydrochloric acid a slowly crystallizing precipitate of crude sulphonyl-urea is obtained which after filtering with suction, washing with water and recrystallization from ethanol of 50% strength melts at 145–147° C. The yield of N-(4-methyl-benzene-sulphonyl) - N' - (β-phenyl-ethyl)-urea obtained amounts to 70% of the theory.

EXAMPLE 6

*N-(3:4-Dimethyl-Benzene-Sulphonyl)-N'-(β-Phenyl-Ethyl)-Urea*

18 grams of N-(3:4-dimethyl-benzene-sulphonyl)-methylcarbamate melting at 90–92° C. (prepared by reaction of 3:4-dimethyl-benzene-sulphamide and chloroformic acid methyl ester in the presence of potassium carbonate and acetone) and 9 grams of β-phenylethyl-amine are mixed and heated for 30 minutes at 130° C. in an oil bath. The clear melt obtained after cooling is recrystallized twice from about 80 cc. of ethyl acetate each time and gives in a very good yield the N-(3:4-dimethyl-benzene-sulphonyl) - N' - (β-phenyl-ethyl)-urea melting at 147.5–149° C.

EXAMPLE 7

*N-(Naphthalene-2-Sulphonyl)-N'-(β-Phenyl-Ethyl)-Urea*

18.5 grams of N-(naphthalene-2-sulphonyl)-methylcarbamate melting at 139–141° C. (prepared in the usual manner by reaction of naphthalene-2-sulphamide and chloroformic acid methyl ester) and 8.5 grams of β-phenyl-ethyl-amine are heated together for 40 minutes at 130° C., and the melt obtained is crystallized after cooling by trituration with ethyl-alcohol and slow dilution with water. The precipitate is filtered off with suction, washed with water, dissolved in a mixture of 150 cc. of dilute ammonia (proportion 1:25) and 400 cc. of water, clarified with charcoal and the clear colourless filtrate is acidified with dilute hydrochloric acid. By filtering with suction, washing with water and recrystallizing from 700 cc. of ethanol of 80% strength the N-(naphthalene-2-sulphonyl) - N' - (β-phenyl-ethyl)-urea melting at 167–169° C. is obtained in a good yield.

EXAMPLE 8

*N-(4-Isopropyl-Benzene-Sulphonyl)-N'-(β-Phenyl-Ethyl)-Urea*

25.7 grams of N - (4 - isopropyl-benzene-sulphonyl)-methylcarbamate melting at 99–102° C. (prepared in the usual manner by reaction of 4-isopropyl-benzene-sulphamide and chloroformic acid methyl ester) and 12.1 grams of β-phenyl-ethyl-amine are heated for 50 minutes at 130° C., the reaction product is cooled to 60° C. and dissolved in 40 cc. of ethanol. Water is added to the alcoholic solution, the precipitated oil is separated from the mother liquor, dissolved in about 180 cc. of dilute ammonia (proportion 1:25), this solution is diluted by means of 100 cc. of water and filtered twice through a layer of charcoal. The colorless and clear filtrate is slowly acidified by means of 1 N-hydrochloric acid. The precipitate that has formed and that is at first half-solid is completely crystallized after having been allowed to stand for a prolonged time. It is filtered off with suction, washed with water and recrystallized from about 170 cc. of ethanol of 60% strength. The N-(4-isopropyl-benzene-sulphonyl)-N'-(β-phenyl-ethyl)-urea melts at 128–130° C.

EXAMPLE 9

*N-(4-Methyl-Benzene-Sulphonyl)-N'-(3'-Phenyl-Propyl)-Urea*

17 grams of N-(4-methyl-benzene-sulphonyl)-ethylcarbamate melting at 82–84° C. (prepared by reaction of p-toluene-sulphamide and chloroformic acid ethyl ester in the presence of potassium carbonate and acetone) and 9.4 grams of 3-phenyl-propyl-amine-(1) are mixed and heated for 40 minutes at 130° C. The melt crystallizing when cooled, is comminuted and dissolved by treatment with about 300 cc. of dilute ammonia (proportion 1:25). Immediately after the dissolution the ammonium salt of the sulphonyl-urea sparingly soluble in water is precipitated. By addition of 2.5 liters of water a clear solution is obtained which is decolorized by means of charcoal and then acidified by dilute hydrochloric acid. After filtration with suction of the precipitate that has formed, washing with water and recrystallization from ethanol of 60% strength, the N-(4-methyl-benzene-sulphonyl)-N'-(4'-phenyl-propyl)-urea melting at 155–157° C. is obtained.

In analogous manner when using 4-phenyl-butylamine-(1) the N-(4-methyl-benzene-sulphonyl)-N'-(4'-phenyl-butyl) urea is obtained (from ethanol of 70% strength) which melts at 128–130° C.

EXAMPLE 10

*N-(4-Methyl-Benzene-Sulphonyl)-N'-(β-Phenyl-Ethyl)-Urea*

34 grams of para-toluene-sulphamide, 60 grams of ground potassium carbonate and 400 cc. of acetone are stirred for 1 hour at 52° C. Within one hour 32 grams of β-phenyl-ethyl-isocyanate are then added dropwise and the whole is stirred at 55° C. for a further five hours. The residue formed after elimination of the acetone by distillation is dissolved in about three litres of water, the solution is clarified twice with charcoal and subsequently cautiously acidified by means of 2 N-hydrochloric acid. The residue which is primarily formed in half-solid state completely crystallizes within a short time. It is filtered off with suction, washed with water and recrystallized from ethanol of 60% strength. In this manner the N-(4-methyl-benzene-sulphonyl)-N'-(β-phenyl-ethyl) - urea is obtained in a good yield. It melts at 145–147° C.

EXAMPLE 11

*N-(3-Chloro-4-Methyl-Benzene-Sulphonyl)-N'-(β-Phenyl-Ethyl)-Urea*

25 grams of 3-chloro-4-methyl-benzene-sulphonyl-ethylcarbamate (melting point 83° C.; prepared by reaction of 3-chloro-4-methyl-benzene-sulphamide with chloroformic acid ethyl ester in acetone in the presence of ground potassium carbonate) are united, with 11 grams of β-phenyl-ethyl-amine while cooled. The mixture is slowly heated in an open flask to 130° C. and maintained at this temperature for 3 hours. After cooling the melt is dissolved in 400 millilitres of dilute ammonia, the solution is clarified with charcoal and acidified with hydrochloric acid. The precipitate which is at first formed in a pasty constitution and which soon crystallizes is filtered off with suction, thoroughly washed with water and dried.

For purification the N-(3-chloro-4-methyl-benzene-sulphonyl)-N'-(β-phenyl-ethyl)urea obtained in a good yield is recrystallized from ethyl acetate. Melting point 124° C.

EXAMPLE 12

*N-(Pentane-3-Sulphonyl)-N'-(β-Phenyl-Ethyl)-Urea*

23 grams of pentane-3-sulphonyl-ethylcarbamate (oil; prepared by reaction of pentane-3-sulphamide with chloroformic acid ethyl ester in acetone in the presence of ground potassium carbonate) and 12.5 grams of β-phenyl-ethylamine are united while cooled and heated to 130° C. for three hours under reduced pressure. After cooling, the melt is dissolved in ether and the ether solution is doubly shaken out with dilute ammonia. The combined aqueous extracts are clarified with charcoal and acidified with hydrochloric acid. The oily precipitate that has been formed crystallizes when digested in the cool. It is filtered off with suction, thoroughly washed with water and dried. For purification the N-(pentane-3-sulphonyl)-N'-(β-phenyl-ethyl)-urea thus obtained in good yield is recrystallized from diiso-propyl ether. Melting point 81° C.

EXAMPLE 13

*N-(4-Phenoxy-Benzene-Sulphonyl)-N'-(β-Phenyl-Ethyl)-Urea*

26 grams of N-(4-phenoxy-benzene-sulphonyl)-methylcarbamate melting at 98–100° C. (prepared by reaction of 4-phenoxy-benzene-sulphamide with chloroformic acid methyl ester in the presence of potassium carbonate and acetone) and 10.3 grams of β-phenyl-ethyl-amine are mixed and heated for 45 minutes at 140° C. in an oil bath. After cooling, the melt obtained is dissolved in dilute ammonia (proportion 1:25) by heating, the solution is clarified with charcoal and cooled. The ammonium salt of the sulphonyl urea obtained which is very sparingly soluble in cold water, thereby crystallizes out. The ammonium salt is again dissolved by further adding water and renewed heating, and the solution, which is still warm, is acidified with dilute hydrochloric acid. The precipitate that has at first been formed in a half-solid constitution is separated from the mother liquor, warmed by means of isopropyl alcohol and cooled, whereby crystallization is provoked. The crystals are filtered off with suction and recrystallized from ethanol. In this manner the N-(4-phenoxy-benzene-sulphonyl)-N'-(β-phenyl-ethyl)-urea is obtained. It melts at 110–112° C.

We claim:
The compound of the formula

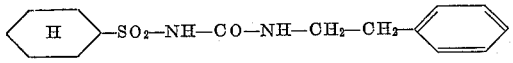

References Cited in the file of this patent

UNITED STATES PATENTS

| | | |
|---|---|---|
| 2,312,404 | Haack | Mar. 2, 1943 |

FOREIGN PATENTS

| | | |
|---|---|---|
| 604,259 | Great Britain | June 30, 1948 |
| 869,935 | France | Nov. 27, 1941 |
| 919,464 | France | Nov. 25, 1946 |
| 993,465 | France | July 25, 1951 |
| 120,428 | Sweden | Dec. 16, 1947 |

OTHER REFERENCES

Bernthsen: Textbook of Org. Chem., pages 372–373, D. Van Nostrand Co., New York (1931).

Whitmore: Organic Chem. (2nd Ed., 1951), pages 611–615, D. Van Nostrand Co., New York.